United States Patent [19]

Kind et al.

[11] Patent Number: 5,230,438

[45] Date of Patent: Jul. 27, 1993

[54] PRESSURE VESSEL

[75] Inventors: Sabine Kind, Gilching; Peter Koran, Weilheim; Wolf-Dietrich Herold, Seefeld, all of Fed. Rep. of Germany

[73] Assignee: Thera Patent GmbH & Co. KG Gesellschaft Fuer Industrielle Schutzrechte, Seefeld, Fed. Rep. of Germany

[21] Appl. No.: 948,281

[22] Filed: Sep. 21, 1992

[30] Foreign Application Priority Data

Sep. 20, 1991 [DE] Fed. Rep. of Germany ... 9111793[U]

[51] Int. Cl.⁵ .............................................. B65D 53/00
[52] U.S. Cl. ..................................... 220/240; 220/295; 220/297
[58] Field of Search ............... 220/240, 316, 293, 295, 220/297, 300, 301, 304; 215/270

[56] References Cited

U.S. PATENT DOCUMENTS

| | | | |
|---|---|---|---|
| 2,483,156 | 9/1949 | Schmitz, Jr. | 220/240 |
| 3,216,608 | 11/1965 | McCormick | 220/295 X |
| 3,687,333 | 8/1972 | Burnett et al. | 220/240 |
| 4,116,352 | 9/1978 | Davis | 215/270 |

FOREIGN PATENT DOCUMENTS 298427 1/1970 Austria .
3116961 4/1981 Fed. Rep. of Germany .

*Primary Examiner*—Stephen P. Garbe
*Assistant Examiner*—Nova Stucker
*Attorney, Agent, or Firm*—Foley & Lardner

[57] ABSTRACT

A pressure vessel includes a body 10 and a cover 12. An O-ring 20 surrounding the upper opening 11 of the vessel body 10 cooperates with a diaphragm 21 sealingly inserted in the cover 12. The diaphragm 21 extends beyond the O-ring 20 in the radial direction inside the cover 12. When the vessel is pressurized, a pressure difference acts on the diaphragm 21 to press an annular plate 23 driven by the diaphragm 21 against the O-ring 20, while the cover 12 is secured by a bayonet locking 24, 25 against being lifted off the vessel body. The pressure inside the vessel is thus used to produce the sealing force. In the unpressurized condition, the cover 12 may be easily placed on the vessel body 10 without effort, and rotation about a small angle is sufficient for securing the cover. In case the bayonet locking has not been completely closed, pressure applied to the vessel will lift the cover 12 by a certain amount, thereby automatically releasing the seal. As a result, no substantial pressure can build up, and the cover is prevented from becoming suddenly disengaged and thrown off the vessel.

9 Claims, 1 Drawing Sheet

PRESSURE VESSEL

BACKGROUND OF THE INVENTION

Pressure vessels are used in many technical fields. They are usually made of metal and pressurized by a gaseous or liquid medium. In typical applications, pressure vessels of this type are employed to supply a liquid substance, such as a liquid adhesive, by means of pressurized air from a container placed in the pressure vessel via a supply line to a location where the adhesive or other liquid is used.

A typical prior-art pressure vessel is disclosed in German Patent specification 3,116,961. This known vessel is intended for use with drainage systems of laundry installations. It has a flange at its upper periphery in which a sealing ring completely surrounding the vessel opening is inserted. The vessel is closed by a pressure cover having a lower flange. The flanges of both the vessel body and the cover are penetrated by eighteen threaded bolts equally spaced along the periphery. A uniform closing pressure is intended to be achieved by tightening the bolts.

Opening and closing the known pressure vessel is time consuming as it requires all bolts to be individually and manually operated. Further, in practice, the individual bolts will be tightened with different torques, which will cause distortions of the cover, possibly even leaks.

Austrian Patent specification 298,427 describes a pressure vessel which comprises a vessel body, a cover and a sealing including a sealing ring sealingly connected to the inner peripheral wall of the cover and an annular element connected to the outer peripheral wall of the vessel body and cooperating with the sealing ring. The sealing ring has an area which is situated radially outwardly of the line of engagement between the sealing ring and the annular element and exposed to the pressure inside the vessel. Further provided is a bayonet-type locking for securing the cover to the vessel body in a first non-sealed position and in a second, sealed closing position.

The pressure inside the vessel is used to create the sealing force by virtue of the pressure difference which acts on the annular surface portion of the sealing ring outside the line of engagement referred to above. The bayonet locking further permits easy and rapid opening and closing of the vessel. Since the pressure supply is disconnected when the vessel is opened or closed, the cover may be placed on, and removed from, the vessel body without effort. The first, non-sealed position of the cover is provided to ensure a gradual pressure reduction when the vessel is opened.

SUMMARY OF THE INVENTION

It is an object of the present invention to provide a pressure vessel with high operational safety and easy handling.

This object is met by a pressure vessel which comprises two vessel portions, one defining a vessel body having an opening and the other defining a cover for closing the opening, seal means including a sealing ring disposed on a first one of the vessel portions so as to surround the opening, and an annular element sealingly connected to the second one of the vessel portions so as to cooperate with the sealing ring, the side of the annular element remote from the sealing ring having a surface portion situated radially outside the sealing ring and being exposed to the pressure inside the vessel, means for locking the cover to the vessel body in a first, non-sealed position and in a second, sealed closing position, and means for automatically releasing the seal means when the cover is in the first position.

In this pressure vessel, the operational safety is increased by the fact that, when the cover has not been completely closed and is therefore lifted to a certain amount upon pressurization of the vessel, the sealing is automatically forced open and any pressure is instantly released. This prevents the cover from being suddenly freed and thrown off the vessel, after a substantial pressure has built up.

In preferred embodiments, the locking means includes a generally L-shaped slot provided in one of the vessel portions and a peg disposed on the other vessel portion and extending transversely of an opening direction of the cover to enable a bayonet-type engagement with the slot. The slot has an entry portion and a catching portion, the catching portion having an inner slot edge which prevents the cover from being lifted off the vessel body and including a first section defining the first, non-sealed position, and a second section remote from the entry portion and defining the second, sealed closing position, and an internal projection between the first and second portions. A further internal projection may be provided between the first portion of the inner slot edge and the entry portion. These projections exactly define two possible closing positions of the cover. Any undefined intermediate position as may result from careless handling is automatically removed when pressure builds up in the vessel.

In a further advantageous embodiment of the invention the annular element is connected to the cover, and the releasing means includes an inner projection provided on the cover for lifting the annular element off the sealing ring when the cover is in the first, non-sealed position. This provides a particularly inexpensive measure to ensure that the seal is forced open when the cover is lifted.

A preferred form of the seal is formed by the annular element including a diaphragm the peripheral portion of which is connected to a peripheral wall of the second vessel portion. The diaphragm may be connected to an annular disc cooperating with the sealing ring.

Alternatively, the annular element may have a flange extending parallel to a peripheral wall of the second vessel portion, with additional seal means being provided between the flange and the peripheral wall.

A further alternative form of the seal may include bellows for sealingly connecting the annular element to the second vessel portion.

In yet another embodiment of the invention the annular element is connected to the cover which has port means for admitting a pressure medium to the vessel. Provided the port means in the cover is not excessively large, the pressure will first build up on the side of the annular element which faces away from sealing ring, with the result that the vessel is sealed as soon as pressure is applied.

DETAILED DESCRIPTION OF PREFERRED EMBODIMENTS

Figure 1:
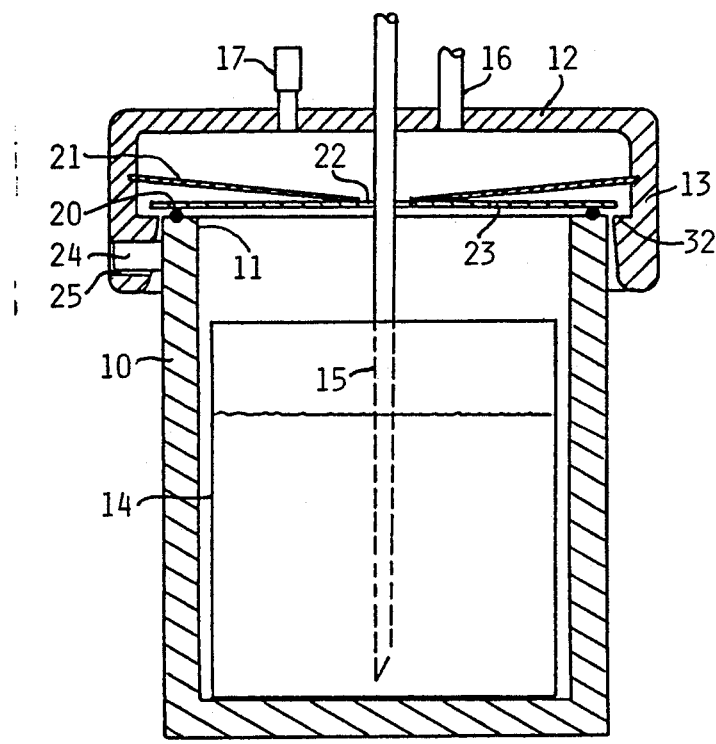
FIG. 1 is a schematic longitudinal section of a pressure vessel with a sealing arrangement according to a first embodiment of the invention.

The pressure vessel shown in FIG. 1 includes a circular-cylindrical vessel body 10 having an upper opening 11 and a cover 12 having a downwardly extending flange 13 extending beyond the upper portion of the outer wall of the body 10 to close the vessel opening 11.

Disposed inside the vessel is an inner container 14 for receiving an adhesive or other liquid to be discharged. A hose 15 penetrates the cover 12 along the vertical centre axis of the vessel and extends into the container 14 to supply the contents of the container 14 to a location outside the vessel where the adhesive or other liquid is used.

A port 16 for admitting a pressurizing medium into the vessel is provided at an eccentric location of the cover 12. The pressurizing medium may be a gas, particularly air, alternatively and depending on the specific application, it may be a liquid. A pressure relief valve 17 is provided at a different location on the cover 12.

The upper peripheral wall surrounding the opening 11 of the vessel body 10 is provided with a annular groove of semi-circular cross section in which an O-ring 20 is inserted. An annular diaphragm 21 having a center opening 22 is disposed in the cover 12 with its peripheral portion being sealingly inserted in the cylindrical flange 13 of the cover. The diaphragm 21 carries an annular plate 23 which is connected to its lower side in the area surrounding the common opening 22. The lower surface of the annular plate 23 engages the O-ring 20.

A bayonet-type closure secures the cover 12 on the vessel body 10 and includes at least two, preferably three, equi-angularly disposed pegs 24 which extend radially outwardly from the upper wall of the vessel body 10. Each peg 24 cooperates with a generally L-shaped slot 25 cut in the flange 13 of the cover 12, the exact shape of which is shown in FIG. 2.

Figure 2:
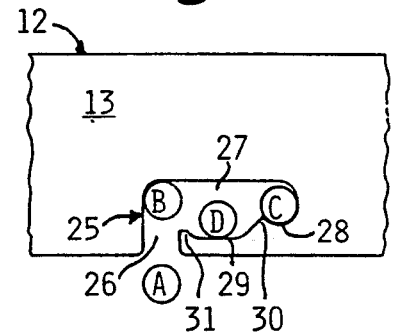
FIG. 2 is a schematic side view of part of the closure arrangement used in the pressure vessel of FIG. 1.

According to FIG. 2, the slot 25 has a vertical entry portion 26 which is open at the lower edge of the cover 12, and a horizontal catching portion 27. Further, the lower slot edge in the catching portion 27 has an inner locking section 28 and a retaining section 29 disposed between the locking section 28 and the entry portion 26. The locking section 28 is defined and separated from the retaining section 29 by an upwardly extending nose 30 on the lower slot edge. In a somewhat similar way, the retaining section 29 is defined and separated from the entry portion 26 of the slot 25 by an upwardly extending nose 31.

FIG. 2 further shows a number of positions (A) to (D) which the peg 24 may assume relative to the slot 25. When the cover 12 is placed on the vessel body 10, the peg is initially in the position (A). When the cover is lowered, the peg moves into position (B). As the cover 12 is subsequently turned in the clockwise direction (movement of the cover portion shown in FIG. 2 to the left), the peg moves towards the right-hand end of the catching portion 27. When the vessel is then pressurized, the cover 12 is lifted and the peg reaches the position (C) in the locking section 28. In this position, the nose 30 and the inner pressure of the vessel prevent the cover 12 from being opened by counter-clockwise rotation.

If the cover 12 was insufficiently rotated to lock it completely, subsequent pressurization will cause the peg 24 to be guided either into the position (C) in the locking section 28 by the right-hand slope of the nose 30, or into the position (D) in the retaining section 29. In the latter zone, the catching portion 27 of the slot 25 has such a vertical width that the cover 12 can be lifted sufficiently to release the seal and permit the pressurizing medium to escape. During this upward movement, an annular projection 32 provided on the inner side of the cover flange 13 will engage the annular plate 23 and lift it our of engagement with the O-ring 20. In this position, the projection 31 automatically prevents the cover from being completely lifted off the vessel body 10.

Instead of a continuous annular projection 32, a number of discrete inwardly projecting noses may be provided along the inner circumference of the cover 12.

The seal shown in FIG. 1 and described above is so devised that, when the cover 12 is placed on the body 10 and fully locked and pressure is subsequently applied, a pressure difference will act on the assembly including the diaphragm 21 and the annular plate 23 to press this assembly downwards against the O-ring 20. The pressure difference results from the fact that the upper surface of the diaphragm 21 exceeds the diameter of the O-ring 20 in the radial direction. The pressure will deform the diaphragm 21 in such a manner that, except in its peripheral portion which is mounted in the flange 13 of the cover 12, it will be flatly pressed and sealed against the annular disc 23.

Provided that the opening 22 formed in the diaphragm 21 and the annular disc 23 is not excessively large, the pressure applied via the port 16 will first build up in the chamber between the upper side of the diaphragm 21 and the lower side of the cover 12 and thereby immediately start to lift the cover 12 and actuate the seal. For increasing this effect, it is advantageous to arrange the pressure admitting port 16 eccentrically in the cover 12, thus at a location offset from the opening 22 provided in the diaphragm 21.

The annular disc 23 is not absolutely necessary. With the cover 12 and vessel body 10 suitably dimensioned and the diaphragm 21 having a suitable flexibility, the diaphragm 21 itself may engage the O-ring 20.

Figure 3:
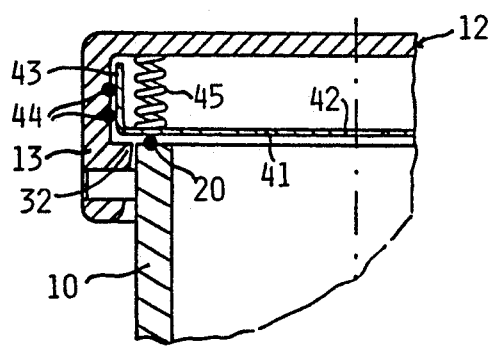
FIGS. 3 and 4 are partial longitudinal sections showing the sealing arrangement according to further embodiments of the invention.

In the modification of FIG. 3, the diaphragm is formed by an annular plate 41 having a central opening 42 and an upwardly extending outer flange 43. Two further O-rings 44 are disposed between the flange 43 and the cylindrical inner wall of the flange 13 of the cover 12 to seal the annular plate 41 with respect to the cover 12. The annular plate 41 is suspended from the lower surface of the cover 12 by a number of flexible connecting elements 45 which captivate the annular plate 41 without impeding its movement relative to the O-ring 20.

In contrast to the embodiment shown in FIG. 1, in which the diaphragm 21 is deformed when pressure is applied, a piston-type displacement of the annular disc 41 takes place in the embodiment of FIG. 3.

Figure 4:
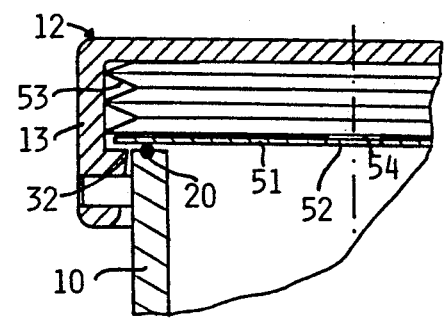

A similar piston-type movement occurs in the embodiment of FIG. 4 which differs from that of FIG. 3 only in that the annular plate 51 is shaped as a flat disc having a central opening 52 and being sealingly connected to the cover 12 by a bellows 53 which has a central opening 54 aligned with the opening 52.

We claim:
1. A pressure vessel comprising two vessel portions, one defining a vessel body having an opening and the other defining a cover for closing the opening, seal means including a sealing ring disposed on a first one of said vessel portions so as to surround said opening, and an annular element sealingly connected to the second one of said vessel portions so as to cooperate with the sealing ring, the side of the annular element remote from said sealing ring having a surface portion situated radially outside the sealing ring and being exposed to the pressure inside said vessel, means for locking the cover to the vessel body in a first, non-sealed position and in a second, sealed closing position, and means for automatically disengaging said sealing ring from said annular element when the cover is in said first position.

2. The pressure vessel of claim 1, wherein said locking means includes a generally L-shaped slot provided in one of said vessel portions and a peg disposed on the other vessel portion and extending transversely of an opening direction of the cover to enable a bayonettype engagement with said slot, said slot having an entry portion and a catching portion, said catching portion having an inner slot edge which prevents the cover from being lifted off the vessel body and including a first section defining said first, non-sealed position, and a second section remote from said entry portion and defining said second, sealed closing position, and an internal projection between said first and second portions.

3. The pressure vessel of claim 2, including a further internal projection between said first portion of said inner slot edge and said entry portion.

4. The pressure vessel of claim 1, wherein said annular element is connected to the cover, and said releasing means includes an inner projection provided on said cover for lifting said annular element off said sealing ring when the cover is in said first, non-sealed position.

5. The pressure vessel of claim 1, wherein said annular element includes a diaphragm the peripheral portion of which is connected to a peripheral wall of said second vessel portion.

6. The pressure vessel of claim 5, wherein said annular element further includes an annular disc connected to said diaphragm, said disc cooperating with said sealing ring.

7. The pressure vessel of claim 1, wherein said annular element has a flange extending parallel to a peripheral wall of said second vessel portion, additional seal means being provided between said flange and said peripheral wall.

8. The pressure vessel of claim 1, including a bellow for sealingly connecting said annular element to said second vessel portion.

9. The pressure vessel of claim 1, wherein said annular element is connected to the cover, said cover having port means for admitting a pressure medium to the vessel.

* * * * *